June 6, 1967  P. CARPIGIANI  3,323,321
CLOSURE PLATE FOR THE ICE-DISPENSING END
OF CONTINUOUS ICE CREAM MACHINES
Filed June 30, 1965  2 Sheets-Sheet 1
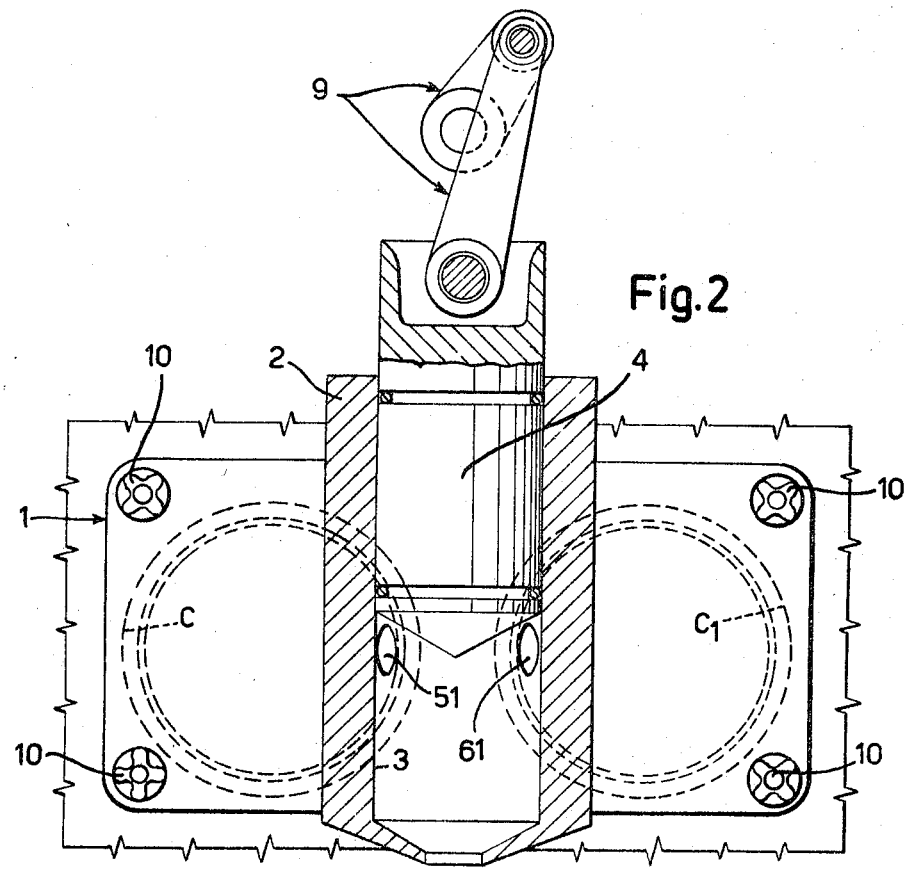
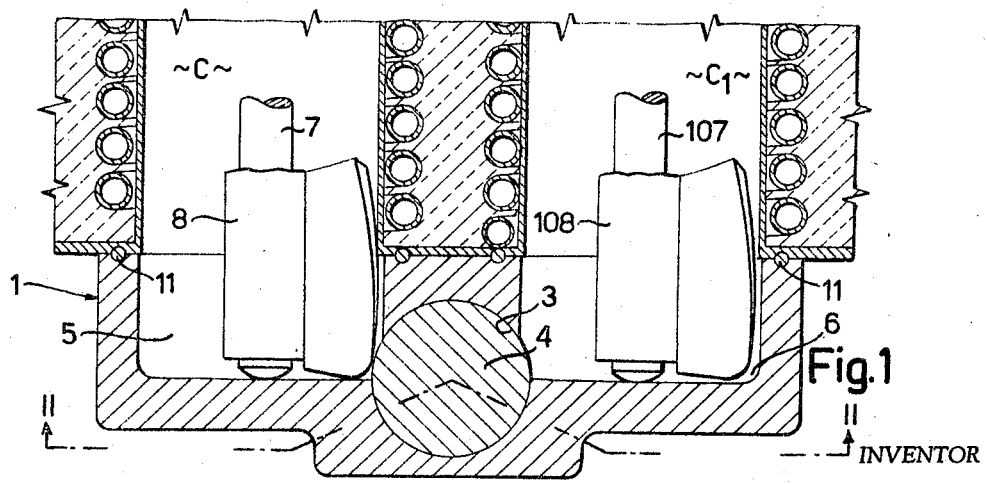
INVENTOR
POERIO CARPIGIANI
BY
*Imirie & Smiley*
ATTORNEYS

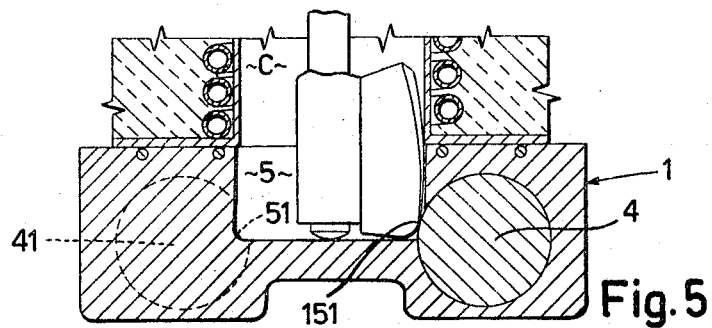
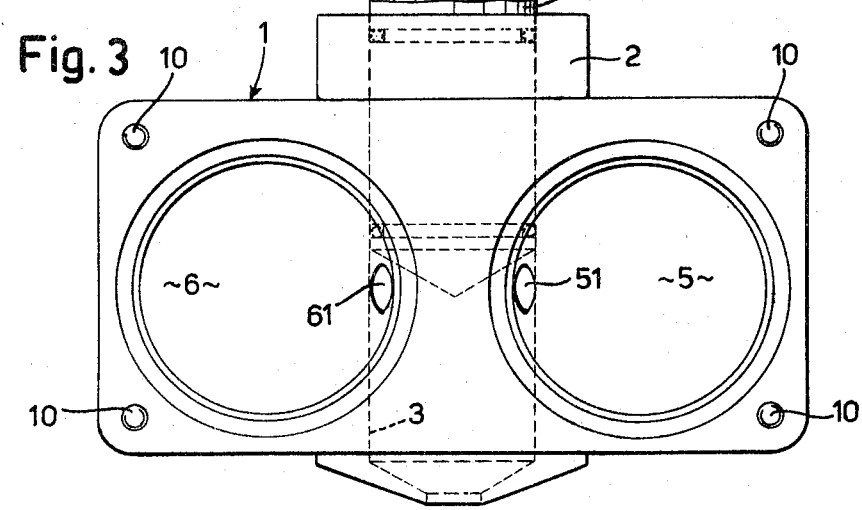
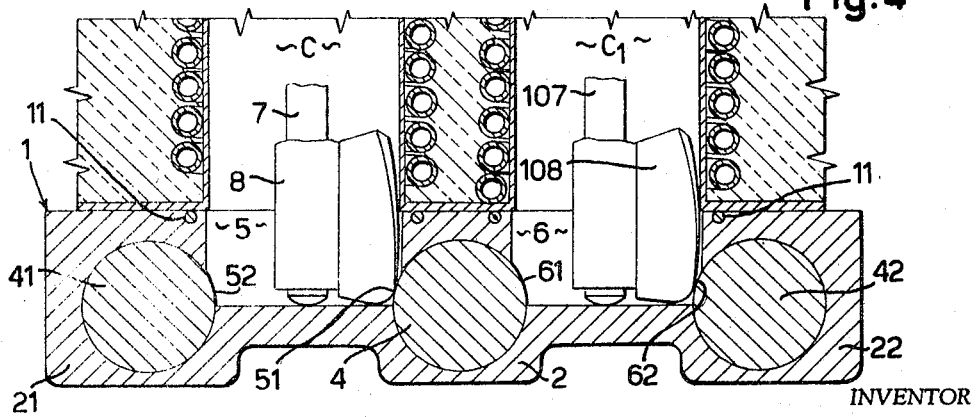

United States Patent Office 3,323,321
Patented June 6, 1967

3,323,321
CLOSURE PLATE FOR THE ICE-DISPENSING END OF CONTINUOUS ICE CREAM MACHINES
Poerio Carpigiani, Bologna, Italy, assignor to APAW S.A., Fribourg, Switzerland, a joint-stock corporation of Switzerland
Filed June 30, 1965, Ser. No. 468,447
Claims priority, application Italy, July 14, 1964, 15,386/64
4 Claims. (Cl. 62—342)

This invention relates to the so-called continuous or "espresso" ice cream machines, for the continuous manufacture of "soft" ice cream, of the kind as disclosed for example in the U.S. Patent 3,018,641, of the same applicant and which comprise at least one mixing and freezing barrel mounted in a cabinet and surrounded with a freezing coil and in which barrel (or in each of a plurality of parallel barrels, in case of multi-barrel ice cream machines) a shaft is rotatably mounted having inclined paddles for mixing the ice cream contained in said cylinder and for forcing the contents of the cylinder towards the front end thereof, which is closed by heat-insulating non-metallic plate or door carrying the means for dispensing the ice cream.

Said continuous ice cream machines, the ice mixing and propelling means of which, as well as their ice cream dispensing means are adapted to be instantaneously operated as desired, are particularly adapted to be connected in a known manner to coin-operated starting devices, thus functioning as fully automatic ice cream machines, which need only to be filled with liquid ice cream mix from time to time. Furthermore, machines of this or like kind have been developed, which comprise two or more parallel freezing and mixing barrels, in each of which a differently flavored ice cream mix is contained and furthermore multiple dispensing cocks or taps have been developed (such as those, for ex. disclosed in the U.S. Patent 3,052,-381 of the same applicant) which, by being applied to the dispensing end of said continuous ice cream machine permit of dispensing two ice cream sorts either separately (from two lateral cocks) or mixed (from an intermediate cock). Now, it has been found that these prior piston cocks, although they function perfectly and are by no means objectionable, when fitted on hand-operated ice cream machines, they are not completely suitable when fitted on to coin-operated automatic ice cream machines. In fact, these machines, even when they are provided with means for automatically operating the ice cream mixers from time to time, when the machines remain idle for quite a long time, it cannot be avoided that the mix contained in the front part of the barrels, and particularly the mix contained in the ample and voluminous ducts through which the ice cream from the freezing cylinders passes into the dispensing cocks, melts during the idle times. Under these conditions, if the machine is hand-operated, the operator may discard, as objectionable, a semi-molten ice, while this is not possible if the ice cream machine is coin-operated.

The main object of the invention is to provide a closure plate for continuous ice cream machines, and particularly suitable for coin-operated machines, by which the voluminous communications ducts within the closure plate provided with dispensing means are eliminated and replaced by simple ports formed in a very thin section of shallow substantially cylindrical recesses formed in the closure plate made of non-metallic material, whereby, in order to provide such ports, the hollow casing of the dispensing means intersects in part the cylindrical recess walls. Further said recesses have a diameter slightly in excess of and in line with the freezing and mixing cylinders of the ice cream machine and, in order to avoid that the ice cream in said recesses may stagnate, the mixers revolving in the corresponding freezing cylinders are slightly extended outside the cylinder end and their last paddle, which is so mounted as to revolve in part almost into contact with the walls of the corresponding plate recess, is so shaped as to snugly fit into said recess and, when revolving, to sweep off any ice mix sticking to the recess walls. In this manner the mix contained in said recesses formed in the front closure plate under the action of the mixing end paddle is caused to flow back and to be mixed with the solid ice cream contained within the adjoining section of the freezing barrel thus producing a soft ice cream having a sufficient hardness. At the same time, the useful volume of the freezing chambers comes to be increased by the additional volume of the recesses.

The invention is particularly adapted for use in automatic machines dispensing two sorts of "soft" ice cream, either separately or in mixture. The invention may be also useful for machines dispensing a single ice cream sort, in which case said machines may be either small machines, or also quite large machines permitting of tapping even two separate ice cream portions at a time, from the same mixing barrel.

The invention will be better understood from the following specification of some preferred embodiment, which are shown by way of example on the accompanying drawings in which:

FIGURE 1 is a longitudinal horizontal section through the dispensing end of a first embodiment of a double-barrelled continuous ice cream machine, provided with a distributing cock for tapping a two-flavor ice;

FIGURE 2 is a vertical section through the dispensing piston cock and a front elevation of the adjoining parts of the closure plate, viewed from line II—II of FIGURE 1;

FIGURE 3 is a rear view of the same closure plate;

FIGURE 4 is a horizontal section like FIGURE 1, through the dispensing end of a double-barrelled ice cream machine provided with a central dispensing cock for double-flavor ice and two side cocks for single flavored ice sorts, and FIGURE 5 is a diagrammatical horizontal section through the dispensing end of a single-barrel ice cream machine, which may be provided either with one or two dispensing cocks.

Referring particularly to the embodiment shown in FIGURES 1 to 3, 1 is a non-metallic plate adapted to be fastened as by screws 10 onto the dispensing end of a continuous ice cream machine provided with a pair of parallel barrels C and C1 in which the shafts 7, 107 carrying conventional mixing paddles 8, 108 are rotatably mounted. For ensuring a tight closure between plate 1 and barrels C and C1, conventional packing means 11 are provided.

Plate 1 is of the kind provided with at least one thick section 2 which extends on the whole plate height and in which a vertical cylindrical bore or cylinder 3 is formed or bored. In this cylinder 3 a piston valve 4 is slidably mounted in vertical direction. This piston may be operated by known means, such as the connecting rod 9 driven by a crank. On one or both sides of said vertical cylinder 3 a shallow horizontal cylindrical recess 5 and/or 6 is bored or formed in such a position as to intersect with a part of its horizontal cylindrical walls, possibly in proximity of its bottom, the vertical wall of the piston cock cylinder 3 thus providing very thin-walled ports 51 and 61 putting the recesses 5 and 6 directly in communication with the cylinder 3. In order to avoid that the ice cream may stagnate in said recesses 5 and/or 6, when the plate 1 is fitted onto the dispensing end of the rearwardly lying horizontal freezing and mixing barrels C and C1, the mixer-driving shafts 7 and 107 are extended beyond the end of the freezing barrels C or C1 into the recesses 5 and 6 and the paddle sections 8 and 108 fastened thereto are so shaped and mounted as to revolve with a snug fit or a slight clearance within said recesses 5 and 6.

It is apparent that, when the machine is operated after a long idle period, the paddles 8 and 108 first re-mix the less cold ice cream within recesses 5 and 6 with the ice cream within the end of the corresponding freezing barrels C and C1 and then they propel the ice cream through the ports 51 and 61 into the dosing cylinder 3 of the piston cock, so that by the downward strokes of piston 4, a saleable two-flavors ice cream mix of sufficient hardness is dispensed.

FIGURE 4 shows a variation of the just-described embodiment: Here the double barrelled continuous ice cream machine is provided with a closure plate 1 having three thickened sections 2, 21, 22 in which three dispensing piston cock cylinders are formed namely, a first one in which the piston 4 is slidably mounted between the two recesses 5 and 6 of plate 1 and the other two, in which the pistons 41 and 42 are mounted, at the outer recess sides, and communicating with the recesses 5 and 6 through ports 52 and 62.

The cylindrical bore of the intermediate dispensing piston 4, has a diameter which is slightly in excess of the distance between two adjoining recesses 5 and 6, so that said vertical cylindrical bore 4 intersects both horizontal bores of said recesses 5 and 6. By this arrangement it is possible to dispense either two differently flavored ices, by operating side pistons 41 and 42 and leaving intermediate piston 4 closed, or also two single-flavor ices, by leaving either of the side pistons 41 and 42 closed and operating the other side piston and the intermediate piston 4, or also it is possible to dispense mixed-flavor ices, as in the first embodiment, by leaving pistons 41 and 42 closed, and operating piston 4.

FIGURE 5 shows two possible arrangements on a single-barrel continuous ice cream machine, which may be provided with one eccentrically lying dispensing cock 4 or 41 or also with a pair of sidewise mounted piston cocks 4 and 41 whose cylinders intersect the walls of a closure plate recess 5, forming a pair of thin-walled ports 51, 151. In case of provision of two independent piston cocks, these may serve for dispensing two ice cream doses at a time.

I claim:
1. For use on continuous ice cream machines of the kind comprising a pair of horizontal ice cream freezing and mixing open-ended barrels in each of which a paddle mixer is rotatably mounted co-axially and whose end section extends outside of the respective barrel, a closure plate adapted to be fitted onto the dispensing end of said barrels, said closure plate being made of non-metallic material and comprising a pair of cylindrical recesses one for each barrel and each having a diameter slightly in excess of the respective barrels and arranged with their horizontal axes at like distance as the corresponding horizontal barrel axes, a thick rib on said plate between said recesses, said rib having a vertical bore of such dimension as to intersect both recess walls and defining a pair of thin-walled ports, means for fastening said plate to the said ice cream machine to tightly close both barrel ends; a piston valve slidably mounted in said vertical bore, and means for operating said piston valve, so as to clear or close said thin-walled ports, according to need, thus establishing or shutting the communication between both said recesses and the piston valve casing.

2. For use on continuous ice cream machines of the kind comprising a pair of horizontal ice cream freezing and mixing open-ended barrels in each of which a paddle mixer is rotatably mounted co-axially and whose end section extends outside of the respective barrel, a closure plate adapted to be fitted onto the dispensing end of said barrels, said closure plate being made of non-metallic material and comprising a pair of cylindrical recesses one for each barrel and each having a diameter slightly in excess of the respective barrel, and arranged with their horizontal axes at like distance as the corresponding horizontal barrel axes; a thick rib on said plate between said recesses, said rib having a vertical bore of such dimension as to intersect both recess walls and defining a pair of thin-walled ports, a second and a third rib by the outer sides of said horizontal recesses; a vertical bore in each of said second and third ribs, each intersecting the wall of the adjoining recess and defining a thin-walled port, means for fastening said plate to the said ice cream machine to tightly close both barrel ends; a piston valve slidably mounted in each of said vertical bores and means for independently operating said piston valves to clear or close said thin-walled ports, according to need, thus establishing the communication of either of or both said recesses with the adjoining piston valve casing.

3. A soft ice cream machine, in combination,
a refrigerating barrel defining a cylindrical bore and having an open outer end,
an insulating cover plate closing said open outer end of the refrigerating barrel and having a recess therein forming an extension of said cylindrical bore, said cover plate being provided with a dispensing bore whose axis is offset from and perpendicular with respect to the axis of said cylindrical bore, said dispensing bore defining a dispensing opening at one end and intersecting said recess intermediate its ends to define thereat a port opening directly into the interior of said recess,
a dispensing piston in said dispensing bore, said piston comprising a body normally covering said port and terminating in a free end normally closing said dispensing opening,
and means for first retracting said piston within said dispensing bore to move said free end thereof to pass and uncover said port and then return said piston to normal position whereby to exhaust the contents of said dispensing bore and minimize the pressure of melted ice cream to be dispensed during a subsequent cycle.

4. An ice cream machine as defined in claim 3 comprising a second refrigerating barrel adjacent to and parallel with the first mentioned barrel, said cover plate having a second recess forming a continuation of said second barrel, and said dispensing bore also intersecting said second recess to define a second port substantially diametrically opposed to the first port and opening directly into said second recess.

References Cited
UNITED STATES PATENTS

| | | | |
|---|---|---|---|
| 2,587,127 | 2/1952 | Erickson et al. | 62—343 X |
| 2,767,553 | 10/1956 | Lewis | 62—342 X |
| 2,916,044 | 12/1959 | Phelan et al. | |
| 3,222,035 | 12/1965 | Lutz et al. | 62—342 X |

ROBERT A. O'LEARY, *Primary Examiner.*

W. E. WAYNER, *Assistant Examiner.*